United States Patent Office 2,738,336
Patented Mar. 13, 1956

2,738,336

MANUFACTURE OF SOLID PHOSPHORIC ACID CATALYSTS

Julian M. Mavity, Hinsdale, Ill., assignor to Universal Oil Products Company, Chicago, Ill., a corporation of Delaware No Drawing. Application September 24, 1952, Serial No. 311,318

13 Claims. (Cl. 252—435)

This application is a continuation-in-part of my copending application Serial No. 99,121, filed June 14, 1949, now abandoned.

This invention relates to the manufacture of solid catalysts useful in accelerating various reactions of unsaturated organic compounds. In a more specific sense, the invention is concerned with the production of a particular type of solid catalyst which is highly active in accelerating and directing olefin conversion reactions, particularly olefin polymerization reactions. This catalyst has also relatively low corrosive properties when employed in the ordinary commercial apparatus comprising various types of steel.

One object of this invention is a method of producing a highly active hydrocarbon conversion catalyst.

Another object of this invention is a highly active catalyst suitable for use in the polymerization of olefinic hydrocarbons and in other conversion reactions involving olefins.

One specific embodiment of this invention relates to a process for manufacturing a solid catalyst which comprises mixing a phosphoric acid and an alkyl orthosilicate to form a composite, and calcining said composite.

An additional embodiment of this invention relates to a process for manufacturing a solid catalyst which comprises mixing a polyphosphoric acid and an alkyl orthosilicate to form a composite, and calcining said composite.

Another embodiment of this invention relates to a process for manufacturing a solid catalyst which comprises mixing a polyphosphoric acid and ethyl orthosilicate to form a composite, and calcining said composite.

A further embodiment of this invention relates to a process for manufacturing a solid catalyst which comprises mixing pyrophosphoric acid and an alkyl orthosilicate to form a composite, and calcining said composite.

A still further embodiment of this invention relates to a process for manufacturing a solid catalyst which comprises mixing pyrophosphoric acid and ethyl orthosilicate to form a composite, and calcining said composite.

The essential and active ingredient of the solid catalysts which are manufactured by this process for use in organic reactions is an acid of phosphorus, preferably one in which the phosphorus has a valence of 5. The acid may constitute 16% to about 75% or more of the catalyst mixture ultimately produced, and in most cases, is over 50% by weight thereof. Of the various acids of phosphorus, orthophosphoric acid ($H_3PO_4$) and pyrophosphoric acid ($H_4P_2O_7$) find general application in the primary mixtures, due mainly to their cheapness and to the readiness with which they may be procured although the invention is not restricted to their use but may employ any of the other acids of phosphorus insofar as they are adaptable. However, it is not intended to infer that the different acids of phosphorus, which may be employed, will produce catalysts which have identical effects upon any given organic reactions as each of the catalysts produced from different acids and by slightly varied procedure will exert its own characteristic action.

In using orthophosphoric acid as a primary ingredient, different concentrations of the aqueous solution may be employed from approximately 75 to 100% or acid containing some free phosphorus pentoxide may even be used. By this is meant that the ortho acid may contain a definite percentage of the pyro acid corresponding to the primary phase of dehydration of the orthophosphoric acid. Within these concentration ranges, the acids will be liquids of varying viscosities, and readily mixed with the aforementioned alkyl orthosilicate.

In practice it has been found that pyrophosphoric acid corresponding to the formula $H_4P_2O_7$ can be incorporated with alkyl orthosilicates at temperatures somewhat above the melting point of the phosphoric acid and the period of heating which is given to the pyro acid-siliceous material or to the mixtures of other polyphosphoric acids and alkyl orthosilicates may be different from that used when the ortho acid is so employed.

Triphosphoric acid which may be represented by the formula $H_5P_3O_{10}$ may also be used as a starting material for preparation of the catalysts of this invention. These catalytic compositions may also be prepared from the siliceous materials mentioned herein and phosphoric acid mixtures containing orthophosphoric acid, pyrophosphoric, triphosphoric, and other polyphosphoric acids.

Another acid of phosphorus which may be employed in the manufacture of composite catalysts according to the present invention is tetraphosphoric acid. It has the general formula $H_6P_4O_{13}$ which corresponds to the double oxide formula $3H_2O.2P_2O_5$ which in turn may be considered as the acid resulting when three molecules of water are lost by four molecules of orthophosphoric acid $H_3PO_4$. The tetraphosphoric acid may be manufactured by the gradual and controlled dehydration by heating of orthophosphoric acid or pyrophosphoric acid or by adding phosphorus pentoxide to these acids in proper amounts. When the latter procedure is followed, phosphoric anhydride is added gradually until it amounts to 520% by weight of the total water present. After a considerable period of standing at ordinary temperature, the crystals of the tetraphosphoric acid separate from the viscous liquid and it is found that these crystals melt at approximately 93° F. and have a specific gravity of 1.1886 at a temperature of 60° F. However, it is unnecessary to crystallize the tetraphosphoric acid before employing it in the preparation of the solid catalysts inasmuch as the crude tetraphosphoric acid mixture may be incorporated with the alkyl orthosilicate.

The alkyl orthosilicates used in the preparation of the catalysts as set forth herein may be regarded as esters of silicic acid and these organic oxygen-containing compounds of silicon have the general formula $Si(OR)_4$ in which R represents an alkyl group generally containing from 1 to about 5 carbon atoms, although these alkyl groups may also sometimes contain more than 5 carbon atoms. The alkyl orthosilicates referred for use in this process include methylorthosilicate, ethylorthosilicate, and the propylorthosilicates.

Catalysts may be prepared from an acid of phosphorus, such as orthophosphoric acid, pyrophosphoric acid, triphosphoric acid, or tetraphosphoric acid and an alkyl orthosilicate. These mentioned starting materials used in this catalyst preparation process are mixed generally at a temperature of from about 50° to about 700° F. to form an aggregate in which the phosphoric acid content is usually in major proportion by weight.

During the mixing of a phosphoric acid and an alkyl orthosilicate even at a temperature as low as about 50° F., an alcohol, ROH, or its equivalent, is formed from the alkyl orthosilicate-phosphoric acid mixture and an aggregate is formed by removal of the alcohol on further heating. The aggregate formed from phosphoric acid and these alkyl orthosilicates is a slightly moist to almost dry material, which on the addition of water, when necessary, and on being compressed, becomes sufficiently plastic to permit extrusion and cutting operations to produce catalyst particles. These extruded particles are then heated at a temperature of from about 200° to about 1000° F. for a time of from about 0.25 to about 10 hours. This heating or calcining treatment of the formed particles of catalyst is usually carried out in a substantially inert gas as air, nitrogen, flue gases, and the like.

The resultant catalyst which has been calcined is active for polymerizing olefinic hydrocarbons particularly for polymerizing normally gaseous olefinic hydrocarbons to form normally liquid hydrocarbons suitable for use as constituents of gasoline. When employed in the conversion of olefinic hydrocarbons into polymers, the calcined catalyst formed as herein set forth, is preferably employed as a granular layer in a heated reactor, which is generally made from steel, and through which the preheated hydrocarbon fraction is directed. Thus the solid catalyst of this process may be employed for treating mixtures of olefin-containing hydrocarbon vapors to effect olefin polymerization, but this same catalyst may also be used at operating conditions suitable for maintaining liquid phase operation during polymerization of olefinic hydrocarbons, such as butylenes, to produce gasoline fractions. When employed in the polymerization of normally gaseous olefins, the formed and calcined catalyst particles are generally placed in a vertical, cylindrical treating tower and the olefin-containing gas mixture is passed downwardly therethrough at a temperature of from about 350° to about 550° F. and at a pressure of 100 to about 1500 pounds per square inch. These conditions are particularly applicable when dealing with olefin-containing material such as stabilizer reflux which may contain from approximately 10 to 50% or more of propylene and butylene. When operating on a mixture comprising essentially butanes and butylenes, this catalyst is effective at conditions favoring the maximum utilization of both normal butylenes and isobutylene which involves mixed polymerization at temperatures of from approximately 250° to about 325° F. and at pressures of from about 500 to about 1500 pounds per square inch.

In utilizing the catalysts of this invention for promoting miscellaneous organic reactions, the catalysts may be employed in essentially the same way as they are used when polymerizing olefins in case the reactions are essentially vapor phase and they also may be employed in suspension in liquid phase in various types of equipment.

With suitable modifications in the details of operation, the present type of catalyst may be employed in a large number of organic reactions including polymerization of olefins as already mentioned. Typical cases of reactions in which the present type of catalyst may be used are the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc.; reactions involving the hydrohalogenation of unsaturated organic compounds, isomerization reactions, ester formation by the interaction of carboxylic acids and olefins, and the like. The specific procedure for utilizing the present type of catalyst in miscellaneous organic reactions will be determined by the chemical and physical characteristics and the phase of the reacting constituents.

During use of these catalysts in vapor phase polymerizations and other vapor phase treatments of organic compounds, it is often advisable to add small amounts of moisture to prevent excessive dehydration and subsequent decrease in catalyst activities. In order to substantially prevent loss of water from the catalyst, an amount of water or water vapor such as steam is added to the charged olefin-containing gas so as to substantially balance the vapor pressure of the catalyst. This amount of water vapor varies from about 0.1 to about 6% by volume of the organic material charged.

Solid phosphoric acid catalysts which have been prepared heretofore by calcining the composite of a siliceous adsorbent and a phosphoric acid are less active in promoting olefin polymerization reactions than the are catalysts produced by this process. In this process, catalysts of these high activities and good crushing strength are formed by compositing from about 16 to about 79% by weight of a phosphoric acid calculated on a water-free basis with from about 21 to about 84% by weight of an alkyl orthosilicate. It is generally preferable to react from about 16 to about 63% by weight of phosphoric acid and from about 37 to about 84% by weight of an alkyl orthosilicate to produce active catalyst composites. When the alkyl orthosilicate used is ethyl orthosilicate, it is generally advisable to commingle from about 25 to about 55% by weight of a phosphoric acid with from about 45 to about 75% by weight of the ethyl orthosilicate to form an aggregate suitable for extrusion and to form catalyst particles. In general, the proportions of starting materials are such that the resultant composite of phosphoric acid and silica contains from about 50 to about 75% by weight of phosphoric acid calculated as $P_2O_5$ and from about 25 to about 50% by weight of silica. Orthophosphoric acid or pyrophosphoric acid and ethyl orthosilicate may thus be reacted to give a composite which, after drying and calcining, has an unexpected high activity along with good crushing strength during use for olefin polymerization reactions, particularly polymerization of propylene and higher olefins.

The following examples of the preparation of catalysts comprised within the scope of this invention and the results obtained in their use for catalyzing the polymerization of propylene are characteristic, although the exact details set forth in these examples are not to be construed as imposing undue limitations upon the generally broad scope of the invention.

EXAMPLE

A solid catalyst was formed as follows by starting with ethyl orthosilicate and orthophosphoric acid: to 107 grams of orthophosphoric acid, containing 85.7% by weight of $H_3PO_4$, in an open evaporating dish was added with stirring 116.5 grams of ethyl orthosilicate. The mixture became a white jelly-like mass and its temperature increased to about 140° F. The mixture was then allowed to stand for one hour with an occasional stirring and was then dried under a heat lamp. The evaporation loss was 101.6 grams, which corresponds closely to the calculated 103 grams loss which would be expected for the evolution of ethyl alcohol formed from the ethyl orthosilicate. As the resultant white powder was too dry for extrusion, it was moistened with 35 cc. of water to form a paste-like material which was again subjected to a heat lamp until a moist powder weighing 134.1 grams was formed into suitable state for extrusion. This plastic material was extruded twice and formed into 5 x 5 mm. pellets; these pellets were dried first for one hour at a temperature of 392° F. and then portions were calcined further at 680° and 860° F. for one hour each. The pellets which had been calcined at a temperature of 680° F. had an average bulk density of 0.713 gram per ml. and a crushing strength of 7.9 pounds, while the pellets similarly calcined at a temperature of 860° F. for one hour had an average bulk density of 0.707 and a crushing strength of 11.1 pounds.

The table shows comparative results obtained in autoclave tests on polymerization catalysts prepared from orthophosphoric acid and ethyl orthosilicate vs. similar tests with samples of a commercially available polymerization catalyst. These catalyst activity tests were carried out by placing 10 grams of catalyst pellets (5 x 5 mm.) and 100 grams of a propane-propylene mixture (50–55% propylene content) in a rotatable steel autoclave of 850 ml. capacity which was then rotated at a temperature of 450° F. for two hours. At the end of this time, determinations were made to show the percentage conversion of propylene into liquid polymers.

*Table*

PROPYLENE POLYMERIZING ACTIVITIES AND CRUSHING STRENGTHS OF CATALYSTS PREPARED FROM ORTHOPHOSPHORIC ACID AND ETHYL ORTHOSILICATE

[Test conditions: 10 grams catalyst pellets, 100 grams propane-propylene mixture, maintained for two hours at a temperature of 450° F. in an 850 cc. rotating steel autoclave.]

| Run No. | Material added to orthophosphoric acid | Calcination | | Percent Conv. $C_3H_6$ | Crushing strengths, lbs. | |
|---|---|---|---|---|---|---|
| | | ° F. | Hrs. | | Before Use | After Use |
| 1 | Ethyl orthosilicate | 680 | 1 | 90.5 | 7.9 | 6.5 |
| 2 | Kieselguhr | 680 | 1 | 66.5 | 11.4 | 5.4 |
| 3 | Ethyl orthosilicate | 860 | 1 | 85.5 | 11.1 | 8.6 |
| 4 | Kieselguhr | 860 | 1 | 48.5 | 16.0 | 9.1 |

From the above table, it can be seen that catalysts prepared from an alkyl orthosilicate, and particularly from ethyl orthosilicate, have an unexpectedly high activity for the conversion of olefins, particularly propylene. The catalysts in the above table prepared from kieselguhr were samples of a commercial catalyst sold for the conversion of olefins into higher boiling polymers. Thus, it is apparent that the catalysts prepared in the manner of the present invention have unexpectedly higher activities than similar silica-containing catalysts, since kieselguhr is essentially silica containing very minor amounts of trace impurities such as iron and sodium. While the crushing strengths of the catalysts prepared in accordance with the example are not as high as those similar crushing strengths of the samples of commercial polymerization catalysts, it will be noted that their strengths after use were very similar. Thus the catalysts prepared in the manner of the present invention do not suffer a drop in crushing strength over the same period of time, which is as sharp in proportion as that experienced with the samples of a commercial polymerization catalyst.

I claim as my invention:

1. A process for manufacturing a highly active solid phosphoric acid catalyst which comprises reacting a phosphoric acid and an alkyl orthosilicate having from 1 to about 5 carbon atoms in each alkyl group, drying and calcining the resultant reaction product.

2. A process for manufacturing a highly active solid phosphoric acid catalyst which comprises reacting a polyphosphoric acid and an alkyl orthosilicate having from 1 to about 5 carbon atoms in each alkyl group, drying and calcining the resultant reaction product.

3. A process for manufacturing a highly active solid phosphoric acid catalyst which comprises reacting a polyphosphoric acid and ethyl orthosilicate, drying and calcining the resultant reaction product.

4. A process for manufacturing a highly active solid phosphoric acid catalyst which comprises reacting from about 16 to about 79% by weight of a phosphoric acid, and from about 21 to about 84% by weight of an alkyl orthosilicate having from 1 to about 5 carbon atoms in each alkyl group, drying and calcining the resultant reaction product.

5. A process for manufacturing a highly active solid phosphoric acid catalyst which comprises reacting from about 16 to about 79% by weight of a phosphoric acid, and from about 21 to about 84% by weight of an alkyl orthosilicate having from 1 to about 5 carbon atoms in each alkyl group at a temperature of from about 50 to about 700° F., drying and calcining the resultant reaction product.

6. A process for manufacturing a highly active solid phosphoric acid catalyst which comprises reacting from about 16 to about 79% by weight of a phosphoric acid, and from about 21 to about 84% by weight of an alkyl orthosilicate having from 1 to about 5 carbon atoms in each alkyl group at a temperature of from about 50 to about 700° F., drying, and calcining the resultant reaction product at a temperature of from about 200 to about 1000° F.

7. A process for manufacturing a highly active solid phosphoric acid catalyst which comprises reacting from about 16 to about 79% by weight of a phosphoric acid, and from about 21 to about 84% by weight of an alkyl orthosilicate having from 1 to about 5 carbon atoms in each alkyl group at a temperature of from about 50 to about 700° F., drying, and calcining the resultant reaction provided at a temperature of from about 200 to about 1000° F. for a time of from about 0.25 to about 10 hours.

8. A process for manufacturing a highly active solid phosphoric acid catalyst which comprises reacting from about 16 to about 63% by weight of a phosphoric acid, and from about 37 to about 84% by weight of an alkyl orthosilicate having from 1 to about 5 carbon atoms in each alkyl group at a temperature of from about 50° to about 700° F., drying and calcining the resultant reaction product.

9. A process for manufacturing a highly active solid phosphoric acid catalyst which comprises reacting from about 16 to about 63% by weight of a phosphoric acid, and from about 37 to about 84% by weight of an alkyl orthosilicate having from 1 to about 5 carbon atoms in each alkyl group at a temperature of from about 50° to about 700° F., drying, and calcining the resultant reaction product at a temperature of from about 200 to about 1000° F.

10. A process for manufacturing a highly active solid phosphoric acid catalyst which comprises reacting from about 16 to about 63% by weight of a phosphoric acid, and from about 37 to about 84% by weight of an alkyl orthosilicate having from 1 to about 5 carbon atoms in each alkyl group at a temperature of from about 50° to about 700° F., drying, and calcining the resultant reaction product at a temperature of from about 200 to about 1000° F. for a time of from about 0.25 to about 10 hours.

11. A process for manufacturing a highly active solid phosphoric acid catalyst which comprises reacting from about 25 to about 55% by weight of a phosphoric acid, and from about 45 to about 75% by weight of ethyl orthosilicate at a temperature of from about 50° to about 700° F., drying and calcining the resultant reacting product.

12. A process for manufacturing a highly active solid phosphoric acid catalyst which comprises reacting from about 25 to about 55% by weight of a phosphoric acid, and from about 45 to about 75% by weight of ethyl orthosilicate at a temperature of from about 50° to about 700° F., drying, and calcining the resultant reaction product at a temperature of from about 200° to about 1000° F.

13. A process for manufacturing a highly active solid phosphoric acid catalyst which comprises reacting from about 25 to about 55% by weight of a phosphoric acid, and from about 45 to about 75% by weight of ethyl orthosilicate at a temperature of from about 50° to about 700° F., drying, and calcining the resultant reaction product at a temperature of from about 200° to about 1000° F. for a time of from about 0.25 to about 10 hours.

References Cited in the file of this patent

UNITED STATES PATENTS

| 2,030,048 | Brown | Feb. 11, 1936 |
| 2,317,803 | Reeves et al. | Apr. 27, 1943 |